US007614604B2

(12) United States Patent
Akabane et al.

(10) Patent No.: US 7,614,604 B2
(45) Date of Patent: Nov. 10, 2009

(54) ELECTROMAGNETIC FUEL INJECTION VALVE

(75) Inventors: Akira Akabane, Miyagi (JP); Kenichi Sato, Miyagi (JP)

(73) Assignee: Keihin Corporation, Tokyo (JP)

( * ) Notice: Subject to any disclaimer, the term of this patent is extended or adjusted under 35 U.S.C. 154(b) by 373 days.

(21) Appl. No.: 10/591,904

(22) PCT Filed: Feb. 25, 2005

(86) PCT No.: PCT/JP2005/003127

§ 371 (c)(1),
(2), (4) Date: Apr. 24, 2007

(87) PCT Pub. No.: WO2005/085627

PCT Pub. Date: Sep. 15, 2005

(65) Prior Publication Data

US 2007/0241299 A1 Oct. 18, 2007

(30) Foreign Application Priority Data

Mar. 9, 2004 (JP) ............................. 2004-065982
Mar. 9, 2004 (JP) ............................. 2004-065983

(51) Int. Cl.
*F16K 31/02* (2006.01)

(52) U.S. Cl. ............................... 251/129.21; 239/585.4

(58) Field of Classification Search ............ 251/129.15, 251/129.21; 239/585.1, 585.4
See application file for complete search history.

(56) References Cited

U.S. PATENT DOCUMENTS 5,518,185 A * 5/1996 Takeda et al. ............ 239/585.4
5,580,000 A * 12/1996 Kiuchi et al. .......... 239/533.12
5,749,527 A * 5/1998 Fujikawa et al. ......... 239/585.3
6,834,667 B2 * 12/2004 Sumiya et al. ......... 137/315.01

(Continued)

FOREIGN PATENT DOCUMENTS

EP 1 617 071 A1 1/2006

(Continued)

*Primary Examiner*—John K Fristoe, Jr.
(74) *Attorney, Agent, or Firm*—Arent Fox LLP

(57) ABSTRACT

In an electromagnetic fuel injection valve in which a valve assembly formed by integrally connecting a valve element and a movable core to each other is contained in a valve housing, and a first journal part and a second journal part are provided in the valve assembly so as to be supported slidably in the guide hole in a valve housing, the outside surface of the first journal part (21) is formed by a sliding surface (45) slidable on the inside surface of the guide hole (14) and a pair of tapered tilt surfaces (46, 47) connecting to both the front and rear sides of the sliding surface (45); at least the tilt surface (47) on the movable core side, of both the tilt surfaces (46, 47), is formed of a first tilt surface part (47*a*) connecting to an end part of the sliding surface (45) and a second tilt surface part (47*b*) connecting to the first tilt surface part (47*a*); and an angle that the first tilt surface part (47*a*) makes with a plane perpendicular to the axis line of a valve shaft part (19*b*) is set larger than an angle that the second tilt surface part (47*b*) makes with the plane. Whereby a decrease in initial fitting property and an increase in abrasion loss can be avoided, and the weight of the valve assembly can be reduced while good response and flow characteristic are maintained.

5 Claims, 4 Drawing Sheets

U.S. PATENT DOCUMENTS

2003/0230649 A1 12/2003 Nagaoka et al.

FOREIGN PATENT DOCUMENTS

| | | | |
|---|---|---|---|
| EP | 1 719 906 | A1 | 11/2006 |
| GB | 2 225 382 | A | 5/1990 |
| GB | 2 225 384 | A | 5/1990 |
| JP | 60-49175 | A | 3/1985 |
| JP | 60-88070 | U | 6/1985 |
| JP | 10-318079 | A | 12/1998 |
| JP | 11-264357 | A | 9/1999 |
| JP | 2000-329035 | A | 11/2000 |
| JP | 2003-035236 | | 2/2003 |
| JP | 2003-227436 | A | 8/2003 |
| JP | 2004-036470 | A | 2/2004 |
| JP | 2004-278464 | A | 10/2004 |

* cited by examiner

ELECTROMAGNETIC FUEL INJECTION VALVE

CROSS-REFERENCE TO RELATED APPLICATION

This application is a National Stage entry of International Application No. PCT/JP2005/003127, filed Feb. 25, 2005, the entire specification claims and drawings of which are incorporated herewith by reference.

TECHNICAL FIELD

The present invention relates to an electromagnetic fuel injection valve including a valve assembly in which a fixed core is connectingly provided at a rear end of a valve housing having a valve seat in a front end part thereof, and a valve element having a valve part capable of being seated on the valve seat and a valve shaft part connecting with the valve part and a movable core opposed to the fixed core are integrally connected to each other, the valve assembly being contained in the valve housing by being urged by spring to the side on which the valve part is seated on the valve seat, a first journal part close to the valve seat and a second journal part separated from the first journal part to the rear side in the axial direction being provided in the valve assembly so as to be slidably supported by a guide hole provided in the valve housing.

BACKGROUND ART

An electromagnetic fuel injection valve in which first and second journal parts, which are slidably supported by a guide hole in a valve housing, are provided in a valve shaft part in a valve assembly with an interval provided in the axial direction, and the outside surface of the first journal part close to a valve seat, of both the journal parts, is formed by a sliding surface capable of sliding on the inside surface of a guide hole provided in the housing and a pair of tapered tilt surfaces connected to both the front and rear sides of the sliding surface has already been known, for example, in Patent Document 1.

Patent Document 1: Japanese Utility Model Application Laid-open No. 60-88070.

DISCLOSURE OF THE INVENTION

Problems to be Solved by the Invention

In the above-mentioned electromagnetic fuel injection valve, a guide clearance between the first and second journal parts provided in the valve assembly and the valve housing is generally set larger on the second journal part side than on the first journal part side considering the assembly of the valve assembly into the valve housing. In the state in which a valve part is seated on the valve seat, therefore, there is a possibility that the valve assembly might tilt. The tilt angle depends on the guide clearance on the second journal part side, and in a state in which the valve part is seated, the first journal part does not come into contact with the inside surface of the guide hole. However, when the valve assembly while being tilted is operated to the valve open side due to the action of an electromagnetic attraction force to a movable core, the first journal part turns with a portion in which the second journal part is in contact with the inside surface of the guide hole being a support point so as to come into contact with the inside surface of the guide hole, and the end part on the movable core side, of the sliding surface forming a part of the outside surface of the first journal part, comes into contact with the inside surface of the guide hole. When the valve assembly is operated in the valve closing direction by an urging force of spring in this state, the end part on the movable core side, of the sliding surface of the first journal part, comes into sliding contact with the inside surface of the guide hole.

In order to reduce the weight of valve assembly by forming the journal part as small as possible, it is preferable that an angle that the tapered tilt surfaces connected to the opposite ends of the sliding surface provided along the axis line direction of the valve shaft part make with a plane perpendicular to the axis line be made as small as possible. However, if the angle is set too small, a connection part between the sliding surface and the tilt surface has an acute angle. In particular, as described above, the connection part between the tilt surface on the movable core side and the sliding surface, of the outside surface of the first journal part, is liable to come into contact with the inside surface of the guide hole according to the tilt of valve assembly, and if the connection part between the tilt surface and the sliding surface has an acute angle, initial fitting with respect to the inside surface of the guide hole is not so good, and the abrasion loss increases, so that the width of sliding surface is liable to change due to the abrasion of the sliding surface. As a result, the response changes, which induces a change in the flow characteristic of fuel.

A simple approach to the solution of this problem is to form the connection part between the tilt surface and the sliding surface so as to be curved. However, this approach results in a comparatively great change in an angle that the connection part makes with the sliding surface due to the abrasion of the sliding surface, which exerts a great influence on the state of friction.

The present invention has been achieved in view of the above-mentioned circumstances, and has an object to provide an electromagnetic fuel injection valve in which the weight of a valve assembly can be reduced while avoiding a decrease in initial fitting property and an increase in abrasion loss and maintaining good response and flow characteristic.

Means for Solving the Problems

In order to achieve the object, according to a first feature of the present invention, there is proposed an electromagnetic fuel injection valve including a valve assembly in which a fixed core is connectingly provided at a rear end of a valve housing having a valve seat in a front end part thereof, and a valve element having a valve part capable of being seated on the valve seat and a valve shaft part connecting to the valve part and a movable core opposed to the fixed core are integrally connected to each other, the valve assembly being contained in the valve housing by being urged by spring to the side on which the valve part is seated on the valve seat, a first journal part close to the valve seat and a second journal part separated from the first journal part to the rear side in the axial direction being provided in the valve assembly so as to be slidably supported by a guide hole provided in the valve housing, characterized in that the outside surface of the first journal part is formed by a sliding surface slidable on the inside surface of the guide hole and a pair of tapered tilt surfaces connecting to both the front and rear sides of the sliding surface; at least the tilt surface on the movable core side, of both the tilt surfaces, is formed of a first tilt surface part connecting to an end part of the sliding surface provided along the axis line of the valve shaft part and a second tilt surface part connecting to the first tilt surface part; and an angle that the first tilt surface part makes with a plane perpendicular to the axis line of the valve shaft part is set larger than an angle that the second tilt surface part makes with the plane.

According to a second feature of the present invention, in addition to the first feature, there is proposed an electromagnetic fuel injection valve in which the sliding surface of the first journal part is formed so that the length thereof in the direction along the axis line of the valve housing is 0.2 to 0.3 mm.

According to a third feature of the present invention, in addition to the first feature, there is proposed an electromagnetic fuel injection valve in which the valve part seated on the valve seat which is tapered is formed in a semispherical shape along an imaginary spherical surface, and the first journal part having the sliding surface slidable in the guide hole in the valve housing is provided in the valve shaft part so that a plane passing through the spherical surface center of the valve part and perpendicularly to the axis line of the valve shaft part is located within the width of the sliding surface.

According to a fourth feature of the present invention, in addition to the third feature, there is proposed an electromagnetic fuel injection valve in which the radius of the sliding surface is set smaller than the radius of the imaginary spherical surface.

According to a fifth feature of the present invention, in addition to the third or fourth feature, there is proposed an electromagnetic fuel injection valve in which the diameter of the valve shaft part is set smaller than the seal diameter at the time when the valve part is seated on the valve seat; at a plurality of places in the circumferential direction of the sliding surface having a larger diameter than that of the seal, a chamfered part for allowing fuel to flow is formed; and the valve assembly is provided with a fuel passage having at least a longitudinal hole having a rear end thereof opened and a front end thereof closed and extending coaxially with the valve shaft part, and a transverse hole leading to the longitudinal hole at the rear from the first journal part.

EFFECT OF THE INVENTION

With the first feature of the present invention, at least the tilt surface on the movable core side, of both the tapered tilt surfaces forming a part of the outside surface of the first journal part, is formed of a first tilt surface part having a sharp slope and a second tilt surface part having a gentle slope, and the first tilt surface part is connected to the end part on the movable core side of the sliding surface, so that the first journal part is formed so as to be as small as possible, whereby the weight of the valve assembly can be reduced. In addition, although a connection part between the tilt surface on the movable core side and the sliding surface easily comes into contact with the inside surface of the guide hole according to the tilt of the valve assembly, at least the connection part between the tilt surface on the movable core side and the sliding surface is prevented from having an acute angle, so that the initial fitting property to the inside surface of the guide hole is good, and the abrasion loss can be kept small. Therefore, good response and flow characteristic can be maintained. Also, since at least the tilt surface on the movable core side is connected to the sliding surface with an angle, the width of the sliding surface is hard to be changed due to the abrasion of the sliding surface, and also the angle that the tilt surface on the movable core side and the sliding surface make does not change, so that an adverse influence is not exerted on the state of friction.

With the second feature of the present invention, even if the guide clearance between the guide hole in the valve housing and the first journal part is set small, setting of the width of the sliding surface as small as about 0.2 to 0.3 mm enables the valve assembly to be opened and closed without impairing the degree of freedom, and also contributes to a decrease in slide resistance.

With the third feature of the present invention, by seating the semispherical valve part on the tapered valve seat, the aligning property of the valve element can be enhanced, and moreover, by arranging the sliding surface of the first journal part at a position closer to the valve part, the guide clearance between the guide hole in the valve housing and the first journal part can be set small. Therefore, the deflection of the valve part at the time of valve closing operation is restrained, and the sealing ability at the time when the valve is seated to be closed can be improved.

With the fourth feature of the present invention, even if the valve assembly swings in the state in which the valve part is seated on the valve seat, the guide clearance can be set smaller so that the sliding surface of the first journal part does not come into contact with the inside surface of the guide hole. Therefore, the deflection of the valve part at the time of valve closing operation is restrained more effectively, and the sealing ability at the time when the valve is seated to be closed can be enhanced. In addition, a smaller diameter of the first journal part can reduce the weight of the valve assembly.

With the fifth feature of the present invention, by decreasing the diameter of the valve shaft part and making the valve assembly hollow, the weight of the valve assembly can further be reduced. In addition, since the fuel from the fuel passage flows through the chamfered parts provided at the plurality of places in the circumferential direction of the sliding surface of the first journal part, the flow of fuel near the valve seat can be stabilized, and thereby the behavior of the valve assembly can also be stabilized.

DESCRIPTION OF THE REFERENCE NUMERALS AND CHARACTERS

| | |
|---|---|
| 8 | valve housing |
| 13 | valve seat |
| 14, 15 | guide hole |
| 18 | movable core |
| 19 | valve element |
| 19a | valve part |
| 19b | valve shaft part |
| 20 | valve assembly |
| 21 | first journal part |
| 22 | second journal part |
| 23 | longitudinal hole |
| 24b | transverse hole |
| 25 | fuel passage |
| 28 | fixed core |
| 45 | sliding surface |
| 45a | chamfered part |
| 46, 47 | tilt surface |
| 47a | first tilt surface part |
| 47b | second tilt surface part |
| C | spherical surface center |
| P | plane |
| S | imaginary spherical surface |

BEST MODE FOR CARRYING OUT THE INVENTION

A mode for carrying out the present invention will now be described based on one embodiment of the present invention shown in the accompanying drawings.

Embodiment 1

FIGS. 1 to 4 show one embodiment of the present invention.

Figure 1:
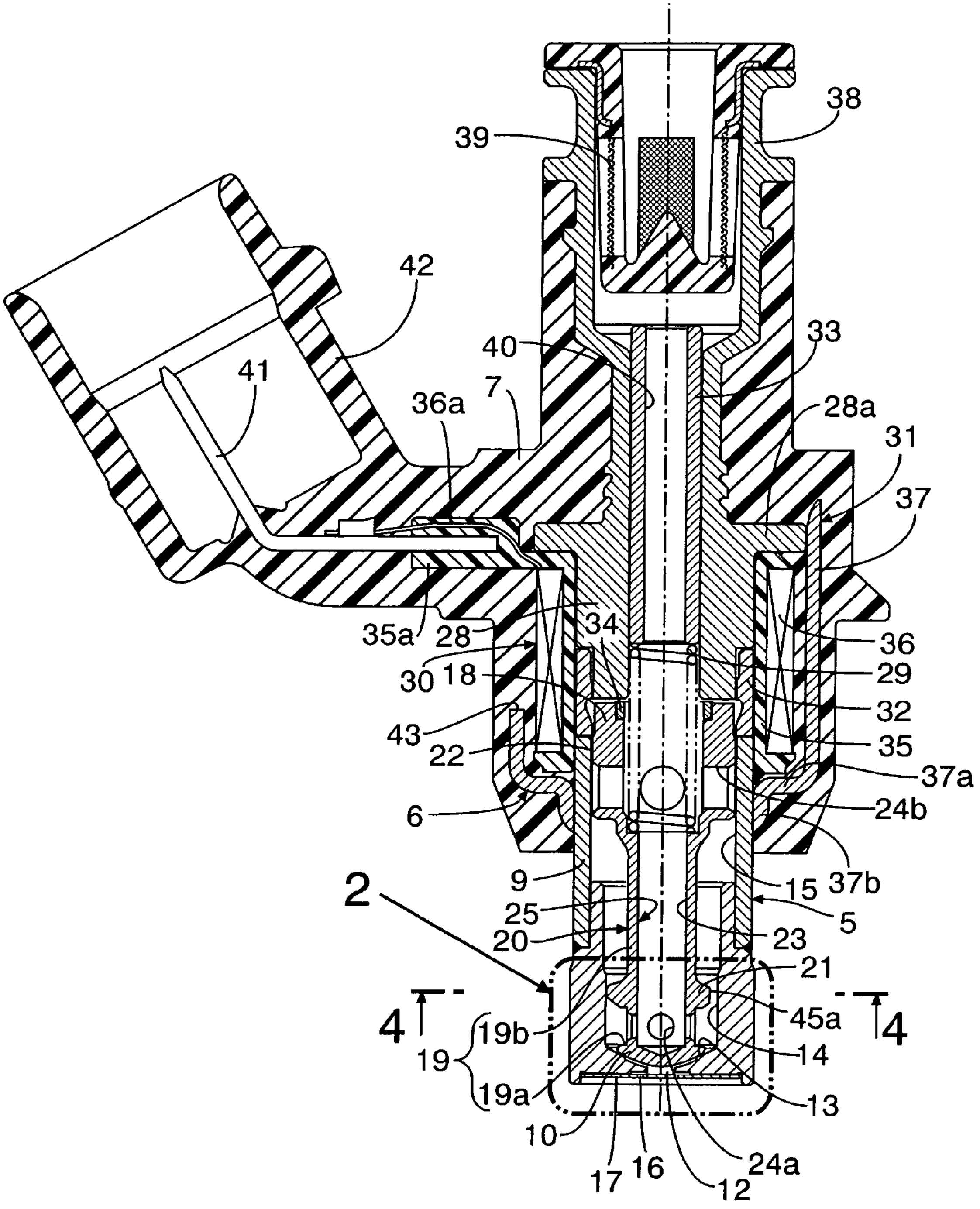
FIG. 1 is a longitudinal sectional view of an electromagnetic fuel injection valve (first embodiment).

First, in FIG. 1, an electromagnetic fuel injection valve for injecting fuel into an engine, not shown, includes a valve operating portion 5 in which a valve assembly 20 urged by spring in such a direction as to be seated on a valve seat 13 is contained in a valve housing 8 having the valve seat 13 at the front end thereof; a solenoid portion 6 in which a coil assembly 30 capable of generating an electromagnetic force for driving the valve assembly 20 to the side such as to be unseated from the valve seat 13 is contained in a solenoid housing 31 connectingly provided on the valve housing 8; and a synthetic resin made covering portion 7 integrally having a coupler 42 for coupling connection terminals 41 connecting with a coil 36 of the coil assembly 30, in which at least the coil assembly 30 and the solenoid housing 31 are sealingly embedded.

The valve housing 8 is made up of a magnetic cylindrical body 9 formed of a magnetic metal and a valve seat member 10 connected to the front end of the magnetic cylindrical body 9 in a fluid-tight manner. The valve seat member 10 is welded to the magnetic cylindrical body 9 in a state in which the rear end part thereof is fitted in a front end part of the magnetic cylindrical body 9. The valve seat member 10 is provided coaxially with a fuel outlet hole 12 that is open in the front end surface thereof, the tapered valve seat 13 connecting with the inner end of the fuel outlet hole 12, and a front guide hole 14 connecting with a large-diameter part at the rear end of the valve seat 13, and the magnetic cylindrical body 9 is provided with a rear guide hole 15 which connects coaxially with the front guide hole 14 and is formed so as to have a diameter larger than that of the front guide hole 14. Also, at the front end of the valve seat member 10, a steel plate made injector plate 17 having a plurality of fuel injection holes 16 leading to the fuel outlet hole 12 is welded all the way around in a fluid-tight manner.

In the valve housing 8, the valve assembly 20 in which a valve element 19 having a valve part 19*a* capable of being seated on the valve seat 13 and a valve shaft part 19*b* connecting with the valve part 19*a* and a movable core 18 forming a part of the solenoid portion 6 are formed integrally by using the same material is contained by being urged by spring to the side on which the valve part 19*a* is seated on the valve seat 13.

The valve assembly 20 is provided with a first journal part 21 slidably supported by the front guide hole 14 provided in the valve housing 8 and a second journal part 22 which is disposed at the rear in the axial direction of the first journal part 21 so as to be slidably supported by the rear guide hole 15 provided in the valve housing 8. The first journal part 21 is provided in the valve shaft part 19*b* close to the valve seat 13, and the second journal part 22 is provided on the movable core 18.

The valve assembly 20 is provided with a longitudinal hole 23 extending coaxially with the valve shaft part 19*b,* the rear end of which is opened and the front end of which is closed by the valve part 19*a,* and a plurality of sets of transverse holes 24*a* and 24*b* leading to the longitudinal hole 23 so as to form a fuel passage 25 through cooperation of these holes.

The transverse holes 24*a* are provided in the valve shaft part 19*b* between the first journal part 21 and the valve part 19*a,* and the transverse holes 24*b* are provided in the movable core 18.

The solenoid portion 6 includes the movable core 18, a cylindrical fixed core 28 opposed to the movable core 18, a return spring 29 for generating a spring force to urge the movable core 18 to the side on which the movable core 18 is separated from the fixed core 28, the coil assembly 30 arranged so as to surround a rear part of the valve housing 8 and the fixed core 28 to enable an electromagnetic force for attracting the movable core 18 to the fixed core 28 side against the spring force of the return spring 29 to be generated, and the solenoid housing 31 surrounding the coil assembly 30 so that the front end part thereof is connected to the valve housing 8.

The rear end of the magnetic cylindrical body 9 of the valve housing 8 is coupled coaxially to the front end of the fixed core 28 via a nonmagnetic cylindrical body 32 formed of a nonmagnetic metal such as stainless steel. The rear end of the magnetic cylindrical body 9 is butt welded to the front end of the nonmagnetic cylindrical body 32, and the rear end of the nonmagnetic cylindrical body 32 is welded to the fixed core 28 in a state in which the front end part of the fixed core 28 is fitted in the nonmagnetic cylindrical body 32.

In the fixed core 28, a cylindrical retainer 33 is coaxially fitted and fixed by staking, and the return spring 29 is interposed between the retainer 33 and the movable core 18. At the inner periphery of the rear end part of the movable core 18, a ring-shaped stopper 34 formed of a nonmagnetic material is pressed in so as to slightly protrude from the rear end surface of the movable core 18 toward the fixed core 28 to avoid a direct contact of the movable core 18 to the fixed core 28. Also, the coil assembly 30 is formed by winding the coil 36 on a bobbin 35 surrounding the rear part of the valve housing 8, the nonmagnetic cylindrical body 32, and the fixed core 28.

The solenoid housing 31 includes a magnetic frame 37, which has, at one end thereof, an annular end wall 37*a* opposed to the end part on the valve operating portion 5 side of the coil assembly 30 and is formed of a magnetic metal in a cylindrical shape surrounding the coil assembly 30, and a flange part 28*a,* which protrudes from the rear end part of the fixed core 28 outward in the radial direction and is opposed to the end part on the opposite side from the valve operating portion 5 of the coil assembly 30. The flange part 28*a* is coupled magnetically to the other end part of the magnetic frame 37. In addition, at the inner periphery of the end wall 37*a* of the magnetic frame 37, a fitting cylinder part 37*b* for fitting the magnetic cylindrical body 9 of the valve housing 8 is provided coaxially, and the solenoid housing 31 is connected to the valve housing 8 by fitting the valve housing 8 in the fitting cylinder part 37*b.*

At the rear end of the fixed core 28, a cylindrical inlet cylinder 38 is connectingly provided integrally and coaxially, and a fuel filter 39 is mounted in the rear part of the inlet cylinder 33. In addition, a fuel passage 40 leading to the longitudinal hole 23 in the movable core 18 is provided coaxially in the inlet cylinder 38, the retainer 33, and the fixed core 28.

The covering portion 7 is formed so that not only the solenoid housing 31 and the coil assembly 30 are sealingly embedded but also a part of the valve housing 8 and most of the inlet cylinder 38 are sealingly embedded while a gap between the solenoid housing 31 and the coil assembly 30 is filled. The magnetic frame 37 of the solenoid housing 31 is provided with a notch part 43 for arranging an arm part 35*a,* which is formed integrally with the bobbin 35 of the coil assembly 30, on the outside of the solenoid housing 31.

The covering portion 7 is integrally provided with the coupler 42 for coupling the connection terminals 41 connecting with both ends of the coil 36 of the coil assembly 30. The proximal end of the connection terminal 41 is embedded in the arm part 35*a,* and coil ends 36*a* of the coil 36 are welded to the connection terminals 41.

Figure 2:
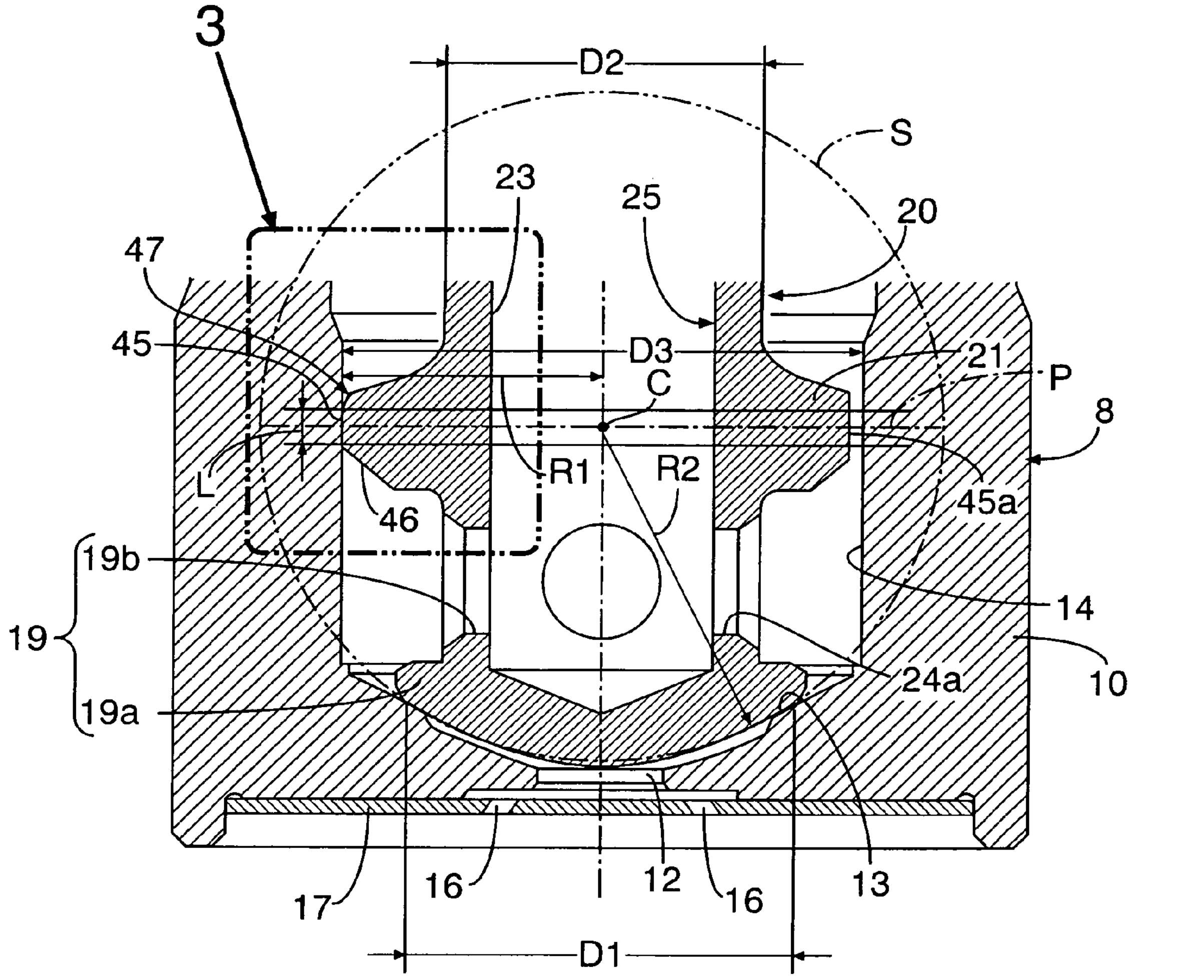
FIG. 2 is an enlarged view of a portion indicated by the arrow 2 of FIG. 1 (first embodiment).

In FIG. 2, the valve seat 13 is formed in a tapered shape, and the valve part 19*a* seated on the valve seat 13 is formed in a semispherical shape along an imaginary spherical surface S. On the other hand, the first journal part 21 slidably supported in the front guide hole 14 in the valve housing 8 is formed by a sliding surface 45 slidable in the front guide hole 14 and a pair of tapered tilt surfaces 46 and 47 connecting with both the front and rear sides of the sliding surface 45. The first journal part 21 is provided in the valve shaft part 19*b* so that a plane P passing through the spherical surface center C of the valve part 19*a* perpendicularly to the axis line of the valve shaft part 19*b* is located within the width of the sliding surface 45.

In addition, the radius R1 of the sliding surface 45 is set smaller than the radius R2 of the imaginary spherical surface S, and the sliding surface 45 is formed so that the length thereof in the direction along the axis line of the valve housing 8, namely, a width L is 0.2 to 0.3 mm.

Also, the diameter D2 of the valve shaft part 19*b* is set smaller than the seal diameter D1 at the time when the valve part 19*a* is seated on the valve seat 13, and the diameter D3 (=R1×2) of the sliding surface 45 is set larger than the seal diameter D1.

Figure 3:
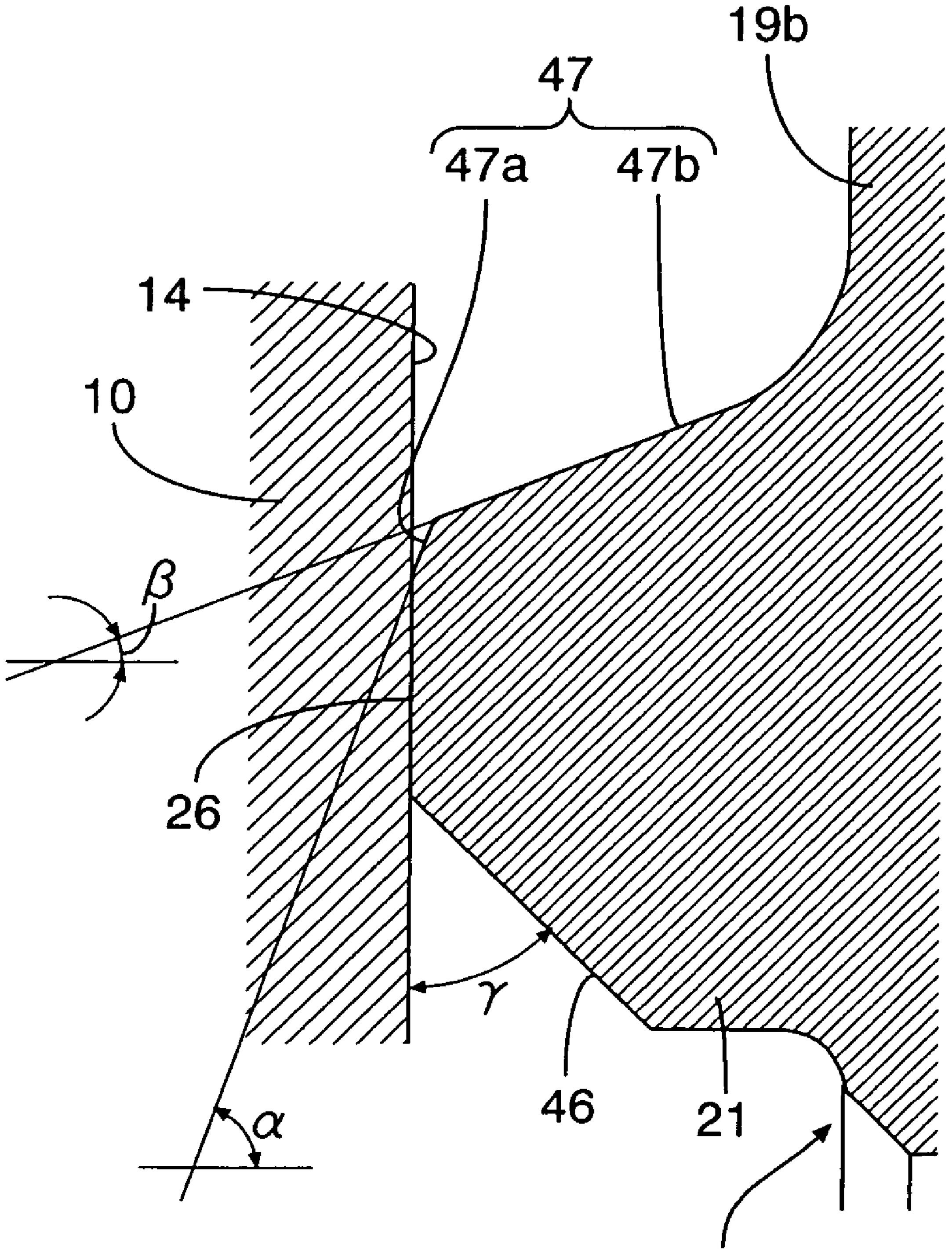
FIG. 3 is an enlarged view of a portion indicated by the arrow 3 of FIG. 2 (first embodiment).

In FIG. 3, at least the tilt surface 47 on the movable core 18 side, of the paired tilt surfaces 46 and 47 forming a part of the outside surface of the first journal part 21, in this example, the tilt surface 47 on the movable core 18 side is made up of a first tilt surface part 47*a* connecting with the end part of the sliding surface 45 provided along the axis line of the valve shaft part 19*b* and a second tilt surface part 47*b* connecting with the first tilt surface part 47*a.* An angle a that the first tilt surface part 47*a* makes with a plane perpendicular to the axis line of the valve shaft part 19*b* is set larger than an angle β that the second tilt surface part 47*b* makes with the said plane. In this example, α and β are set at 70 degrees and 20 degrees, respectively.

Also, the tilt surface 46 on the valve seat 13 side, of the paired tilt surfaces 46 and 47 that the first journal part 21 has, is formed in a tapered shape with an angle γ with respect to the plane perpendicular to the axis line of the valve shaft part 19*b* being fixed. In this example, the angle γ is set at 45 degrees.

Figure 4:
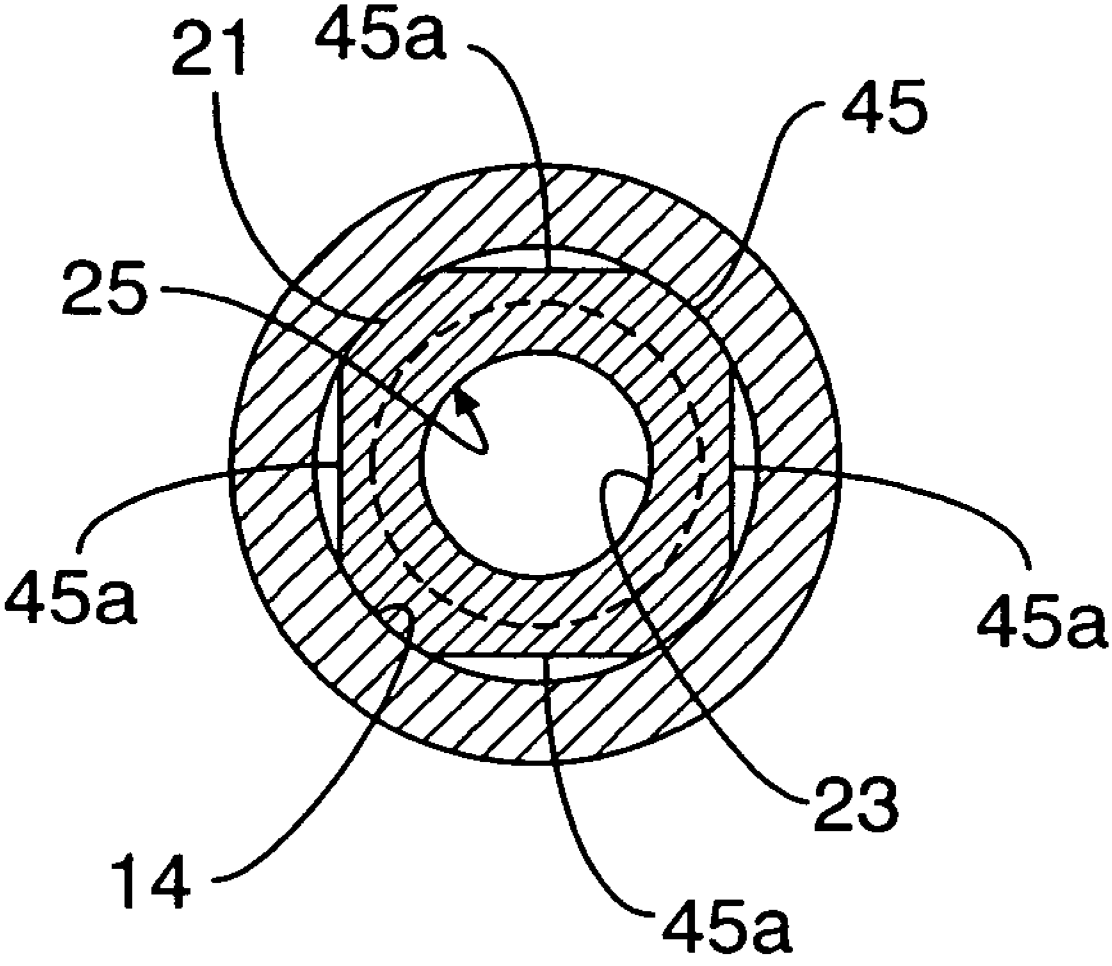
FIG. 4 is a sectional view taken along the line 4-4 of FIG. 1 (first embodiment).

In FIG. 4, at a plurality of places in the circumferential direction of the sliding surface 45 of the first journal part 21, plane-shaped chamfered parts 45*a* for allowing fuel to flow are formed, so that the fuel flowing into the valve housing 8 through the transverse holes 24*b* of the fuel passage 25 passes between the chamfered parts 45*a* and the valve housing 8 and flows to the valve seat 13 side.

Next, the operation of this embodiment will be explained. The outside surface of the first journal part 21 close to the valve seat 13, of the first and second journal parts 21 and 22 provided on the valve assembly 20, is made up of the sliding surface 45 slidable on the inside surface of the front guide hole 14 provided in the valve seat member 10 of the valve housing 8 and the paired tapered tilt surfaces 46 and 47 connecting with both the front and rear sides of the sliding surface 45. The tilt surface 47 on the movable core 18 side, of both the tilt surfaces 46 and 47, is made up of the first tilt surface part 47*a* connecting with the end part of the sliding surface 45 provided along the axis line of the valve shaft part 19*b* and the second tilt surface part 47*b* connecting with the first tilt surface part 47*a,* and the angle a that the first tilt surface part 47*a* makes with the plane perpendicular to the axis line of the valve shaft part 19*b* is set larger than the angle β that the second tilt surface part 47*b* makes with the said plane.

That is to say, the tilt surface 47 on the movable core 18 side, of the tapered tilt surfaces 46 and 47 forming a part of the outside surface of the first journal part 21, is made up of the first tilt surface part 47*a* having a sharp slope and the second tilt surface part 47*b* having a gentle slope. Therefore, the first journal part 21 is formed so as to be as small as possible, by which the weight of the valve assembly 20 can be reduced.

In addition, although the connection part between the tilt surface 47 on the movable core 18 side and the sliding surface 45 easily comes into contact with the inside surface of the front guide hole 14 according to the tilt of the valve assembly 20, since the first tilt surface part 47*a* having a sharp slope is connected to the end part of the movable core 18 side of the sliding surface 45, the connection part between the tilt surface 47 on the movable core 18 side and the sliding surface 45 is prevented from having an acute angle, so that the initial fitting property to the inside surface of the front guide hole 14 is good, and the abrasion loss can be kept small. Therefore, good response and flow characteristic can be maintained.

Also, since at least the tilt surface 47 on the movable core 18 side, in this embodiment, both the tilt surfaces 46 and 47 are connected to the sliding surface 45 with an angle, the width of the sliding surface 45 is less liable to be changed due to the abrasion of the sliding surface 45, and also the angles that both the tilt surfaces 46 and 47 and the sliding surface 45 make do not change, so that an adverse influence is not exerted on the state of friction.

In addition, since the sliding surface 45 of the first journal part 21 is formed so that the length L in the direction along the axis line of the valve housing 8 is 0.2 to 0.3 mm, even if the guide clearance between the front guide hole 14 in the valve housing 8 and the first journal part 21 is set small, the setting of the width of the sliding surface 45 as small as about 0.2 to 0.3 mm enables the valve assembly 20 to be opened and closed without impairing the degree of freedom, and also contributes to a decrease in slide resistance.

The guide clearance between the first and second journal parts 21 and 22 provided in the valve shaft part 19*b* of the valve assembly 20 and the valve housing 8 is generally set so that the guide clearance on the second journal part 22 side is larger than that on the first journal part 21 side considering the assembly of the valve assembly 20 into the valve housing 8. Therefore, in the state in which the valve part 19*a* is seated on the valve seat 13, there is a possibility that the valve assembly 20 tilts, and the tilt angle depends on the guide clearance on the second journal part 22 side, so that it is necessary to set the diameter of the first journal part 21 so that in the state in which the valve part 19*a* is seated, the first journal part 21 does not come into contact with the inside surface of the front guide hole 14.

On the other hand, if the diameter of the first journal part 21 is made small and the guide clearance is made too large, the deflection of the valve part 19*a* at the time of valve opening operation becomes great, so that exact seating of the valve part 19*a* on the valve seat 13 is difficult to perform, which may result in a decrease in sealing ability at the time of seating.

In the electromagnetic fuel injection valve disclosed in Patent Document 1 (Japanese Utility Model Application Laid-open No. 60-88070), the first journal part is provided in the valve shaft part at a position comparatively distant from the valve part to the rear side, so that the guide clearance in the first journal part must inevitably be set comparatively large. Therefore, the deflection of the valve part at the time of valve opening operation becomes great, and the sealing ability at the time of seating may decrease.

By contrast, in the present invention, the valve part 19*a* seated on the valve seat 13 formed in a tapered shape is formed in a semispherical shape along the imaginary spherical surface S, and the first journal part 21 is provided in the valve shaft part 19*b* so that the plane P passing through the spherical surface center C of the valve part 19*a* perpendicularly to the axis line of the valve shaft part 19*b* is located within the width of the sliding surface 45.

Thereupon, by seating the semispherical valve part 19*a* on the tapered valve seat 13, the aligning property of the valve element 19 can be enhanced, and also by arranging the sliding surface 45 of the first journal part 21 at a position closer to the valve part 19*a*, the guide clearance between the front guide hole 14 in the valve housing 8 and the first journal part 21 can be set, for example, as small as 4 to 6 μm. Therefore, the deflection of the valve part 19*a* at the time of valve opening operation is restrained, and the sealing ability at the time when the valve is seated to be closed can be improved.

Also, since the radius R1 of the sliding surface 45 of the first journal part 21 is set smaller than the radius R2 of the imaginary spherical surface S, even if the valve assembly 20 swings in the state in which the valve part 19*a* is seated on the valve seat 13, the guide clearance can be set smaller so that the sliding surface 45 of the first journal part 21 does not come into contact with the inside surface of the front guide hole 14. Therefore, the deflection of the valve part 19*a* at the time of valve opening operation is restrained more effectively, and the sealing ability at the time when the valve is seated to be closed can be enhanced. In addition, a smaller diameter of the first journal part 21 can reduce the weight of the valve assembly 20.

Furthermore, the diameter D2 of the valve shaft part 19*b* is set smaller than the seal diameter D1 at the time when the valve part 19*a* is seated on the valve seat 13; at the plurality of places in the circumferential direction of the sliding surface 45 having the diameter D3 larger than the seal diameter D1, the chamfered parts 45*a* for allowing fuel to flow are formed; and the valve assembly 20 is provided with the fuel passage 25 having at least the longitudinal hole 23 extending coaxially with the valve shaft part 19*b*, the rear end of which is opened and the front end of which is closed, and the transverse holes 24*b* leading to the longitudinal hole 23 at the rear from the first journal part 21, in this example, the valve assembly 20 is provided with the fuel passage 25 having the longitudinal hole 23 and the plurality of sets of transverse holes 24*a* and 24*b* leading to the longitudinal hole 23. Therefore, the diameter of the valve shaft part 19*b* is decreased, and the valve assembly 20 is made hollow, by which the weight of the valve assembly 20 can further be reduced. In addition, since the fuel from the fuel passage 25 flows through the chamfered parts 45*a* provided at the plurality of places in the circumferential direction of the sliding surface 45 of the first journal part 21, the flow of fuel near the valve seat 13 can be stabilized, and thereby the behavior of the valve assembly 20 can also be stabilized.

Although an embodiment of the present invention has been explained above, the present invention is not limited to the above-mentioned embodiment, and various design changes can be made without departing from the spirit and scope of the invention defined in the appended claims.

The invention claimed is:

1. An electromagnetic fuel injection valve including a valve assembly (20) in which a fixed core (28) is connectingly provided at a rear end of a valve housing (8) having a valve seat (13) in a front end part thereof, and a valve element (19) having a valve part (19*a*) capable of being seated on the valve seat (13) and a valve shaft part (19*b*) connecting to the valve part (19*a*) and a movable core (18) opposed to the fixed core (28) are integrally connected to each other, the valve assembly (20) being contained in the valve housing (8) by being urged by spring to the side on which the valve part (19*a*) is seated on the valve seat (13), a first journal part (21) close to the valve seat (13) and a second journal part (22) separated from the first journal part (21) to the rear side in the axial direction being provided in the valve assembly (20) so as to be slidably supported by guide holes (14, 15) provided in the valve housing (8), characterized in that the outside surface of the first journal part (21) is formed by a sliding surface (45) slidable on the inside surface of the guide hole (14) and a pair of tapered tilt surfaces (46, 47) connecting to both the front and rear sides of the sliding surface (45); at least the tilt surface (47) on the movable core (18) side, of the both tilt surfaces (46, 47), is formed of a first tilt surface part (47*a*) connecting to an end part of the sliding surface (45) provided along the axis line of the valve shaft part (19*b*) and a second tilt surface part (47*b*) connecting to the first tilt surface part (47*a*); and an angle that the first tilt surface part (47*a*) makes with a plane perpendicular to the axis line of the valve shaft part (19*b*) is set larger than an angle that the second tilt surface part (47*b*) makes with said plane.

2. The electromagnetic fuel injection valve according to claim 1, wherein the sliding surface (45) of the first journal part (21) is formed so that the length thereof in the direction along the axis line of the valve housing (8) is 0.2 to 0.3 mm.

3. The electromagnetic fuel injection valve according to claim 1, wherein the valve part (19*a*) seated on the valve seat (13) which is tapered is formed in a semispherical shape along an imaginary spherical surface (S), and the first journal part (21) having the sliding surface (45) slidable in the guide hole (14) in the valve housing (8) is provided in the valve shaft part (19*b*) so that a plane (P) passing through the spherical surface center (C) of the valve part (19*a*) and perpendicularly to the axis line of the valve shaft part (19*b*) is located within the width of the sliding surface (45).

4. The electromagnetic fuel injection valve according to claim 3, wherein the radius of the sliding surface (45) is set smaller than the radius of the imaginary spherical surface (S).

5. The electromagnetic fuel injection valve according to claim 3 or 4, wherein the diameter of the valve shaft part (19*b*) is set smaller than the seal diameter at the time when the valve part (19*a*) is seated on the valve seat (13); at a plurality of places in the circumferential direction of the sliding surface (45) having a larger diameter than that of the seal, a chamfered part (45*a*) for allowing fuel to flow is formed; and the valve assembly (20) is provided with a fuel passage (25) having at least a longitudinal hole (23) having a rear end thereof opened and a front end thereof closed and extending coaxially with the valve shaft part (19*b*), and a transverse hole (24*b*) leading to the longitudinal hole (23) at the rear from the first journal part (21).

* * * * *